July 19, 1932. H. GAILLARD 1,867,882
DIFFERENTIAL PULLEY
Filed July 13, 1931
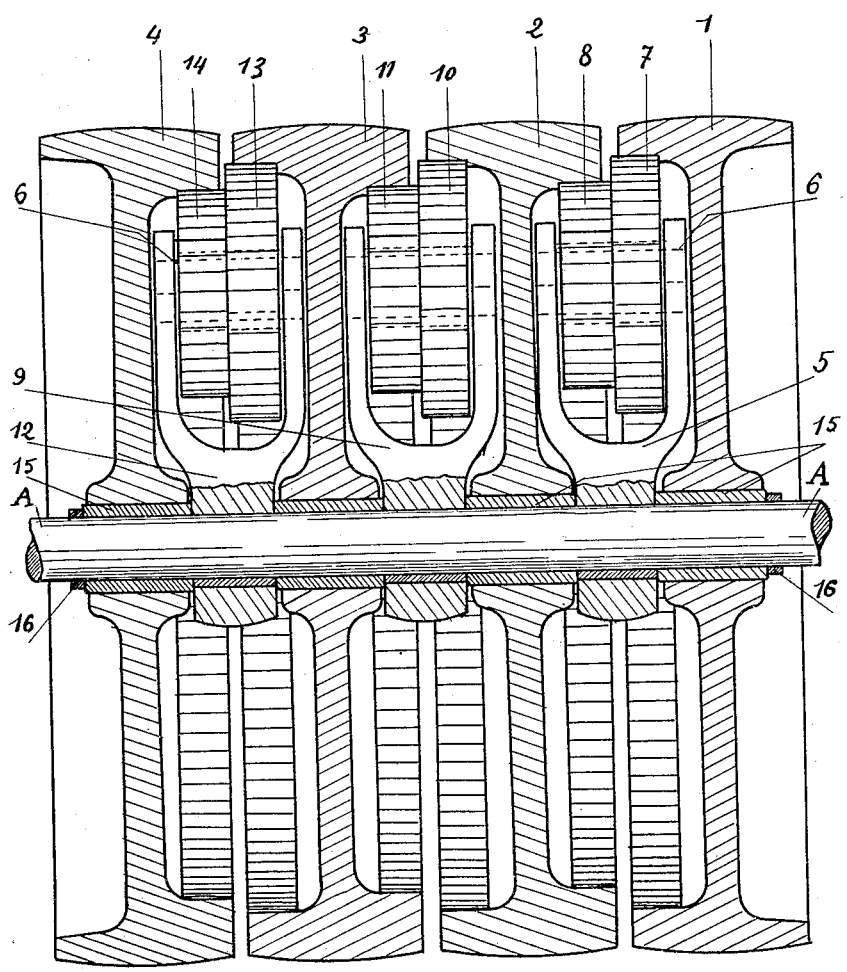
Inventor
Henri Gaillard.
By Williams, Bradbury
McCaleb & Hinkle, Attys.

Patented July 19, 1932

1,867,882

UNITED STATES PATENT OFFICE

HENRI GAILLARD, OF NANTERRE, FRANCE

DIFFERENTIAL PULLEY

Application filed July 13, 1931, Serial No. 550,319, and in Germany August 15, 1930.

The present invention relates to differential pulleys and has for its primary object to provide a differential pulley of such improved construction that by simply shifting a belt laterally from one portion or section of it to another the speed transmitted may be varied at will very progressively without resorting to an electric drive and without jerks within wide limits.

A further object of the invention is to provide a differential pulley made up of a sequence of pulley-sections of equal outer diameter so as to prevent the belt shifted from one section to the neighboring section from undergoing sudden tractional stresses capable of causing rapid wear and tear of same.

A still further object of the invention is to provide a differential pulley made up of a sequence of pulley-sections driven simultaneously at differentiated and gently progressive rotational speeds by means of internally located stepped gears revolubly mounted in stationary yokes supporting them very firmly and without vibrations, thus completely avoiding the use of planetary gears and the well known disadvantages that are inherent thereto such as rapid wear, necessity of frequent adjustments, large waste and splashing of lubricating oil, and skidding of the belt.

Still a further object of the invention is to provide a differential pulley comprising a sequence of pulley-sections and internally located gears driving them pairwise differentially with a minimum of undue friction, lubrication of the revoluble members being ensured simply and cheaply, and wherein moreover antifriction and/or ball or roller bearings may even be used for ensuring operation substantially without lubrication.

Still a further object of the invention is to provide a differential pulley comprising a stationary and one-piece i. e. very strong shaft capable of supporting heavy transmission loads and carrying a sequence of pulley-sections all of equal outer diameter for forming a substantially continuous cylindrical surface on which shifting of the belt is performed most easily, all the gears ensuring the differential drive of said pulley-sections being located internally of the latter i. e. protected and abstracted from sight, which makes the unit rugged, compact, not liable to warping and pleasant looking.

With these and such other objects in view as will incidentally appear hereafter, the invention comprises the novel construction and arrangement of parts that will now be described with reference to the accompanying drawing wherein is illustrated by way of example and without limitation as to the scope of the invention and in diagrammatic way a convenient constructional form of the same.

The head pulley-section 1 is actuated by any convenient prime mover, for instance direct from a motor or through any suitable transmission. In the illustration, the inner surface of the left hand side of this head pulley-section 1 i. e. that side situated to the left of the web of said pulley-section is formed with a predetermined number of equally-sized teeth which mesh permanently with the larger cogged element or pinion 7 of a stepped gear 7—8 rigidly secured in any approved way to a stud 6 journalled, preferably with the interposition of ball or roller bearings intermediate the legs of a bifurcated yoke 5 rigidly secured to the supporting straight shaft A of the differential pulley unit, this shaft A being held stationary i. e. prevented from rotating, in any suitable way.

The smaller cogged element or pinion 8 of the stepped gear 7—8 has a number of teeth smaller (to any approved extent as reckoned before hand) than the number of teeth of the companion cogged element 7 to which it is bolted, screwed or otherwise suitably secured, and it meshes permanently with the correspondingly toothed inner surface of the right portion of the pulley-section 2 also loosely mounted on the shaft A and slightly spaced from the head pulley-section 1, both pulley-sections 1 and 2 having the same outer diameter.

The left portion of the pulley-section 2 has its inner surface also toothed regularly (the number of the teeth or in other terms the length of the primary circle of the toothing thus provided being reckoned depending on the differential speed to be derived from said pulley) and these teeth mesh permanently with the larger cogged element or pinion 10 of a second stepped gear 10—11 rigidly held on a stud 6 journalled intermediate the legs of a bifurcated yoke 9 rigidly secured to the stationary supporting shaft A.

Adjacent the second pulley-section 2, to the left and at a small distance therefrom is loosely mounted on the supporting shaft A a third pulley-section 3 of equal outer diameter which, similarly, is formed on the inner surface of its right portion with a regular sequence of uniformly-sized teeth which mesh with the cogged element or pinion 11 of the stepped gear 10—11 whereby said pulley-section 3 is driven by said gear at an angular speed which is dependent upon the gearing ratio provided therebetween.

The inner surface of the left portion of the pulley-section 3 is formed with a regular sequence of teeth (different of course from the number of teeth formed on the inner surface of its right portion) which mesh permanently with the larger cogged element or pinion 13 of a stepped gear 13—14 rigidly mounted upon a stud 6 journalled in the legs of a bifurcated yoke 12 rigidly held upon the supporting shaft A. The smaller cogged element 14 of said gear 13—14 meshes with the inner toothed surface of the right portion of a fourth pulley-section 4 which has an outer diameter equal to the one of the pulley-sections 1, 2, 3 and is driven at an angular speed dependent upon the gearing ratio provided between the gear element 14 and said pulley-section 4.

Anti-friction bushings 15 permitting an easier revolution of the pulley-sections 1, 2, 3, 4 about the supporting shaft A and reducing rattle are provided between said shaft and the enlarged hubs of said pulley-sections.

The pulley-sections 1, 2, 3, 4 are held in their relative slightly spaced positions by end thrust rings 16 fitted around the shaft A. Proper meshing of the gears 7—8, 10—11, 13—14 is thus also ensured throughout the life of the differential pulley thus constructed.

The pulley-sections 1, 2, 3, 4 all being of the same outer diameter form a substantially continuous cylinder over which the belt (not shown) can be readily shifted from one pulley-section to the other for the purpose of changing the driving speed.

Lubrication of the studs 6 is superfluous if they are fitted with ball bearings; if they are merely journalled in the legs of their supporting yokes without the interposition of any ball or roller bearings, a grease cup may be provided as usual. Lubrication of the shaft A and bushings 15 may be conveniently ensured by a main oil groove provided in said shaft and a number of oil grooves branching therefrom and leading to the respective bushings.

It will be appreciated that, as the gears 7—8, 10—11 and 13—14 merely revolve with the studs 6 in the stationary rigid yokes, they can not splash out any oil or other lubricating medium as is often the case with differential pulleys using planetary gears. The avoidance of any splashing of the lubricating medium is of special advantage because said medium can not accede to the outer surfaces of the pulley-sections and cause slipping or skidding of the driving belt or otherwise damage to the surrounding parts.

As a practical example intended to illustrate the invention, the head pulley-section 1 may have an outer diameter equal to 325 millimeters and may be provided internally with 120 teeth, the cogged element 7 of the stepped gear 7—8 having 40 teeth whereby a rotational speed of 300 r. p. m. imparted to said head pulley-section 1 causes the gear 7—8 to rotate at 900 r. p. m. If now the cogged element 8 of said gear has 32 teeth, and the co-ordinated right portion of the pulley-section 2 has 112 teeth, it will be seen that this pulley-section will rotate at 257 r. p. m. Now assuming the gearing ratio to be the same as stated above between the pulley-sections 3 and 4 and the gears 10—11 and 13—14, it will be seen that the pulley-section 3 will be rotated at 221 r. p. m. and the pulley-section 4 at 189 r. p. m.

The sequence of increasingly large rotational speeds obtainable from the successive pulley-sections can naturally be varied by suitably calculating each gearing ratio between any of the internal gears and the co-ordinated pulley-sections. Thus the speed progression may be made very gentle for avoiding any jerks being imparted to the machine or power receiving unit driven by the belt when the latter is shifted from one pulley-section to the next one. Such a gentle progression of the speeds obtainable through the differential pulley is of special utility in connection with lathes or similar machines where the action on the work has to be carried out very progressively, and where the rotational speed of said machines has to be accelerated gradually in proportion as more metal or other material is removed from the work under treatment.

The pitch of the cogged elements of which the internal gears are made up may be the same from one element to another, the rotational speeds obtainable from the several pulley-sections being then merely differentiated by differentiating the respective numbers of teeth without changing their pitch. However for fine adjustments of the speeds to be derived from the pulley-sections, it will be appreciated that the pitch of the respective teeth of the gearing elements may also be differentiated.

The elements of the differential pulley hereinbefore described may be made of course of any suitable material but the internal gears are advantageously formed of a material chosen for lessening as much as possible noise or rattle incidental to the normal operation of the pulley for providing a substantially noiseless transmission unit.

Numerous constructional details might of course be altered without departing from the scope of the invention. Thus for example the number of the pulley-sections may vary and the construction of the internal gears located therebetween for transmitting energy from the one to the other at a differential angular speed may be modified. All such variations are intended to be involved in the scope of the appended claims.

What I claim is:

1. A differential pulley comprising, in combination, a stationary straight shaft, a series of adjacent pulley-sections revolubly mounted independently on the shaft, said pulley-sections being of equal outer diameter for forming a substantially continuous cylindrical surface and being formed on the inner surface of their rims with differentiated numbers of gearing teeth, a plurality of rigid bifurcated yokes firmly held on the shaft and housed in the respective spaces between the successive pulley-sections, and a plurality of stepped gears revolubly mounted between the legs of the respective yokes and each composed of two contiguous pinions rigidly secured to each other and having differentiated diameters and differentiated numbers of teeth which permanently mesh with the associated teeth on the inner surface of the two adjacent pulley-sections housing the corresponding yoke, the gearing ratios between the pulley-sections and the corresponding gears being such as to cause the rotational speeds obtainable from said pulley-sections to increase progressively from one end of the pulley to the opposite end.

2. A differential pulley comprising, in combination, a stationary straight shaft, a series of adjacent pulley-sections revolubly mounted independently on anti-friction bushings engaged on the shaft, said pulley-sections being of equal outer diameter for forming a substantially continuous cylindrical surface and being formed on the inner surface of their rims with differentiated numbers of uniformly-sized gearing teeth, a plurality of rigid bifurcated yokes firmly held in alignment on the shaft and housed in the respective spaces between the successive pulley-sections, studs journalled in the legs of the respective yokes, and a plurality of stepped gears fixed to the respective studs for freely rotating with respect to the yokes, each of said gears being composed of two contiguous pinions rigidly secured to each other and having differentiated diameters and differentiated numbers of teeth which permanently mesh with the associated teeth on the inner surface of the two adjacent pulley-sections housing the corresponding yoke, the gearing ratios between the pulley-sections and the corresponding gears being such as to cause the rotational speeds obtainable from said pulley-sections to increase progressively from one end of the pulley to the opposite end.

3. A differential pulley comprising, in combination, a stationary straight shaft, a series of adjacent pulley-sections revolubly mounted independently on anti-friction bushings engaged on the shaft, said pulley-sections being of equal outer diameter for forming a substantially continuous cylindrical surface and being formed on the inner surface of their rims with differentiated series of uniformly-sized gearing teeth of differentiated pitch from one series to the other, a plurality of rigid bifurcated yokes firmly held in alignment on the shaft and housed in the respective spaces between the successive pulley-sections, studs journalled in the legs of the respective yokes, and a plurality of stepped gears fixed to the respective studs for freely rotating with respect to the yokes, each of said gears being composed of two contiguous pinions of differentiated diameters rigidly secured to each other and having different numbers of teeth of differentiated pitch which permanently mesh with the associated gearing teeth on the inner surface of the two adjacent pulley-sections housing the corresponding yoke, the gearing ratios between the pulley-sections and the corresponding gears being such as to cause the rotational speeds obtainable from said pulley-sections to increase progressively from one end of the pulley to the opposite end.

In testimony whereof I affix my signature.

HENRI GAILLARD.